March 17, 1936. P. D. HAY 2,034,342
WEATHER GUARD FOR AUTOMOBILE BODIES
Filed Aug. 8, 1935
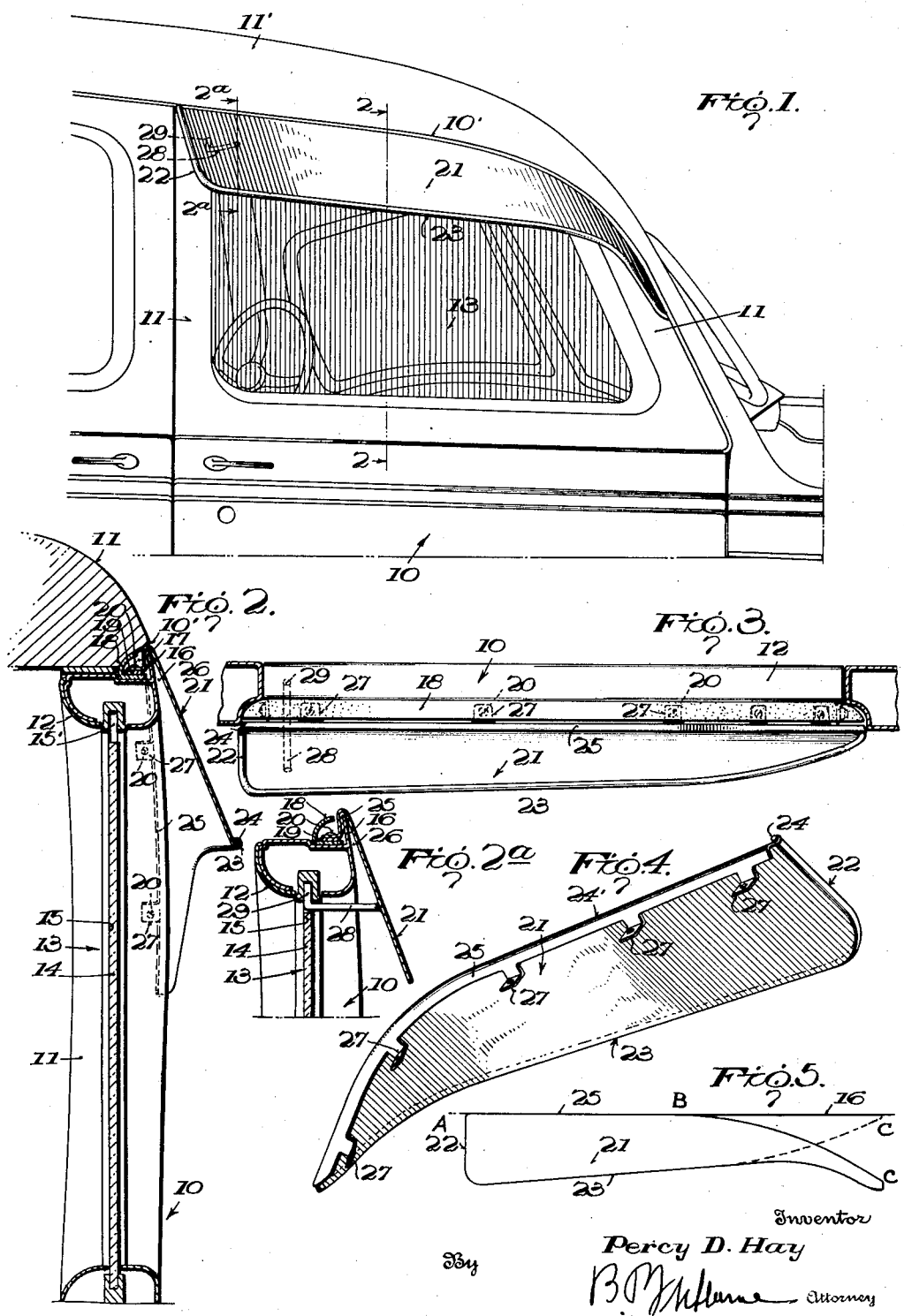
Inventor
Percy D. Hay
By B. J. Milburn Attorney Patented Mar. 17, 1936

2,034,342

UNITED STATES PATENT OFFICE 2,034,342

WEATHER GUARD FOR AUTOMOBILE BODIES

Percy D. Hay, Charleston, S. C.

Application August 8, 1935, Serial No. 35,372

9 Claims. (Cl. 296—44)

My invention relates to weather guards or visors for automobile bodies.

As is well known, many of the latest types of automobile bodies, of the streamline design, have the top of the body so constructed that it does not project laterally for any considerable distance beyond the tops of the doors, but is substantially flush therewith. The drain gutter heretofore used upon the top of the body adjacent to the top of the doors is usually dispensed with. The doors of these latest type automobile bodies are longitudinally curved in a vertical direction and bulge outwardly beyond the free edge of the top of the body. The doors are also longitudinally curved in a horizontal direction. Such a construction is found in various makes of automobiles, now upon the market.

As a result of this construction and arrangement, in driving an automobile of this general design, during a rain, it is usually necessary to have the glass or closure element of the door completely or substantially closed, as otherwise the rain will freely pass into the body of the automobile. This renders driving during a rain, in hot weather, very uncomfortable.

In accordance with my invention, I provide a weather guard which will prevent the entrance of rain into the body of the automobile, of the types referred to, when the closure element or glass is open, and will also serve as a sun shield, thus adding greatly to the comfortable use of the car.

In the preferred embodiment of my invention, I provide a guard which is preferably formed of resilient material, such as sheet metal, and which is adapted to be bodily mounted upon the top of the swinging door of the automobile body, of the type referred to, for movement therewith, to opened and closed positions. The weather guard engages over the top edge of the door and is secured thereto. This is preferably effected by using certain of the screws which retain the usual rubber weather strip in place, without in any way altering the construction of the door, but the invention is not necessarily restricted to the use of these particular screws as separate screws or attaching elements may be employed if desired. It is also preferred to construct the resilient body portion of the weather guard in one piece and substantially flat, in its original condition, but the mounting of such body portion upon the door, due to the shape of the body portion, will cause the body portion to be longitudinally twisted or flexed, to some extent, whereby it is curved transversely, to correspond generally to the curvature of the top of the body. This places the body portion of the guard under tension, and a brace is preferably secured to the body portion, near its rear end, and preferably engages within the glass receiving groove of the door, to hold the rear portion of the weather guard in a suitable outward position, against its inward tension, which tension holds all parts against rattling.

It is to be understood that my invention is in no sense restricted to its application to any particular make of automobile body hereinbefore mentioned, as it may be applied to other designs of bodies. The invention also resides in the combination and arrangement of elements as recited in the annexed claims, and these claims are in no way restricted by the description of the invention in the introductory portion of this specification.

In the accompanying drawing forming a part of this application and in which like numerals are employed to designate like parts throughout the same, Figure 1 is a side elevation of a weather guard embodying my invention, showing the same applied to the body of a Chrysler "Airflow" automobile, Figure 2 is a vertical transverse section taken on line 2—2 of Figure 1, Figure 2a is a similar view taken on line 2a—2a of Figure 1, Figure 3 is a plan view of the guard, parts of the automobile body being in general horizontal section, Figure 4 is a perspective view of the weather guard, and, Figure 5 is a diagrammatic plan view showing the guard arranged partly upon the door, before flexing into position.

In the drawing, wherein for the purpose of illustration is shown a preferred embodiment of my invention, the numeral 10 designates the horizontally swinging door of an automobile body. This door is longitudinally curved in a vertical direction and bulges outwardly beyond the free edge 10' of the top 11' of the body. The door is further longitudinally curved in a horizontal direction and bulges outwardly. The door comprises vertical side rails 11 and a top rail 12, affording a window opening 13, adapted to be covered and uncovered by a vertically movable closure element or glass 14, operating within vertical grooves 15 and a horizontal groove 15'. The horizontal rail 12 is provided at its outer edge with a vertical flange 16, to enter a recess 17, when the door is closed. The numeral 18 designates a hollow packing element or weather strip, formed of rubber, and secured to the upper surface of the rail 12 by a metal strip 19, attached to the rail by screws 20. The foregoing is the construction of the Chrysler "Airflow" automobile body.

My weather guard comprises a preferably one-piece body portion 21, formed of resilient sheet metal or the like, and having transverse and longitudinal edges provided with hollow beads 22 and 23, respectively, inclosing a reinforcing wire 24, to stiffen the body portion 21, at these edges. The body portion 21 of the guard is resilient, as stated, and is flat before it is applied to the door. The beads 22 and 23 preferably project outwardly in a lateral direction. The body portion 21 is tapered longitudinally and decreases in width toward its forward end and the edges 23 and 24' are curved, producing a streamlined effect.

At the edge 24', the body portion 21 is bent downwardly, producing a continuous generally vertical flange 25, extending throughout the entire length of the body portion 21, and forming a passage 26 for the reception of the flange 16 of the door. At spaced intervals, the flange 25 has ears 27, preferably integral therewith, and bent at a right angle thereto. These ears have apertures 27'. These apertured ears are adapted to be inserted within the tubular or hollow weather strip 18, through the open side thereof, and are clamped to the metal strip 19, by removing certain of the screws 20, which are then passed through the apertured ears 27 and are again inserted into the same openings in the strip 19 and screwed into the horizontal rail 12, to thereby clamp ears 27, strip 19 and weather strip 18 to the horizontal rail 12.

As stated, the body portion of the guard is flat as originally made, but is flexible and resilient. When the body portion 21 of the guard is brought in proximity to the top rail 12 of the door, such body portion is transversely inclined with respect to the door and projects laterally outwardly from the same. The rear portion of the flange 25 extending from the rear end A to about the point B will engage properly behind the up-standing flange 16, and the ears 27 will rest upon the strip 19, but the remaining portion of the flange 25 from about the point B to the forward end C cannot now engage behind the flange 16, for it diverges from the same in a lateral direction by virtue of the transverse inclination of the body portion 21. The tapered end of the body portion 21 must therefore be bent inwardly toward the door so that the forward portion of the flange 25 may be moved to a position to the rear of the upstanding flange 16, and the body portion 21 is accordingly held under tension until all of the ears 27 are secured to the top rail 12 by the screws 20. The inward bending of the tapered forward end of the body portion 21 places the entire body portion 21 under tension and flexes the lower longitudinal edge thereof inwardly, and this inward movement is checked by a brace 28 attached to the body portion 21, upon its inner surface, by welding or the like, near its rear end. The brace has an upturned end 29, adapted to enter the horizontal groove 15' in the top rail 12. This brace holds the lower edge of the body portion 21 in a position outwardly of the position that it would assume if not opposed, and the inward tension of the body portion thereby securely retains the end 29 of the brace in the groove 15' and holds all parts against rattling movement. Particular attention is called to the fact that the forward tapered end portion of the body portion 21 extends forwardly beyond the window opening and glass 14 and also extends downwardly beyond the lower edge of the body portion 21, for a substantial distance. One of the ears 27 is arranged adjacent to the forward free end of the forward tapered end of the body portion 21. The forward tapered end of the body portion 21 extends downwardly to a point about equi-distantly spaced from the top and bottom of the window opening, thereby providing a guard of substantial vertical dimension, against rain or the like entering through the window, due to the forward travel of the automobile. At the same time, this reduced depending end portion of the guard does not obstruct the side vision through the window. The upper edge 24 is substantially straight between points A and B and is then inclined or curved downwardly sharply between points B and C. The body portion 21 is transversely inclined when placed in position, and it is this transverse inclination which causes the forward edge portion between points B and C to diverge outwardly from the upper rail 12, when the rear portion of the flange 25 is placed behind the flange 16. This necessitates the forward end portion of the guard between points B and C being flexed or bent inwardly and downwardly so that the forward portion of the flange 25 will also engage behind flange 16, as stated.

While I have shown my weather guard as applied to the "Airflow" automobile, this has been done for the purpose of illustration only, and the invention is not necessarily restricted to this particular installation. While the apertured ears 27 are arranged to register with the original screws 20, for coaction therewith, separate screws may be employed for the purpose of attachment, when the locations of the ears 27 are varied.

It is to be understood that the form of my invention herewith shown and described is to be taken as a preferred example of the same and that various changes in the shape, size, and arrangement of parts may be resorted to, without departing from the spirit of the invention or the scope of the subjoined claims.

Having thus described my invention, what I claim is:

1. A weather guard for an automobile door having a top rail, comprising a body portion which is resilient throughout its entire length and normally substantially flat throughout its entire length, the body portion being tapered at one end to provide a relatively long narrow portion, such relatively long narrow portion normally extending laterally from the longitudinal attaching edge of the body portion, and means for attaching the body portion to the top rail when the relatively long narrow portion is bent inwardly so that its inner longitudinal edge is in substantial alignment with the attaching inner longitudinal edge of the body portion and securing the body portion to the rail throughout substantially the entire length of the body portion and maintaining the body portion laterally inclined with respect to the rail.

2. A weather guard for an automobile door having a top rail provided with an upstanding flange, the guard comprising a sheet metal body portion which is resilient throughout its entire length and also normally substantially flat throughout its entire length, the body portion being tapered at its forward end to provide a relatively long narrow portion, such relatively long narrow portion normally extending laterally in an outward direction with relation to the inner longitudinal attaching edge of the body portion, said body portion being provided at its inner longitudinal attaching edge and upon its inner side with a flange which extends substantially throughout the length of the body portion and its narrow portion, the flange of the body portion being disposed transversely at an angle to the body portion so that the body portion is held transversely inclined when such flange engages behind the upstanding flange of the rail, and means to retain the flange of the body portion in place when applied to the upstanding flange.

3. A weather guard for an automobile door having a top rail provided with an upstanding flange, the guard comprising a sheet metal body portion which is resilient throughout its entire length and also originally substantially flat throughout its entire length, the body portion being tapered at its forward end to provide a relatively long narrow portion terminating in a reduced end, such relatively long narrow portion normally extending laterally in an outward direction with relation to the inner longitudinal attaching edge of the body portion, said body portion being provided at its inner longitudinal attaching edge and upon its inner side with a flange which extends substantially throughout the entire length of the body portion and its narrow portion, the flange of the body portion being disposed transversely at an angle to the body portion so that the body portion is held transversely inclined when such flange engages behind the upstanding flange of the rail, means to retain the flange of the body portion in place when applied to the upstanding flange, and a brace attached to the body portion near its wide end and engaging the door to hold such wide end against vibration.

4. The combination with an automobile door having a top rail, provided with an upstanding flange, of a weather guard comprising an originally substantially flat resilient body portion, said body portion having its forward portion tapered whereby the forward portion of its upper longitudinal edge is inclined with relation to the rear portion of such upper edge, the body portion being provided at its upper edge with a longitudinal flange arranged at an angle with relation to the body portion so that the body portion is held transversely inclined when the depending flange is generally vertically arranged behind the upstanding flange, the forward inclined portion of the upper edge diverging from the rail so that the forward end portion of the body portion is bent inwardly to bring the forward portion of the depending flange behind the upstanding flange and thereby place the body portion under tension, and means for attaching the depending flange to the rail and holding such flange in a generally vertical position.

5. The combination with an automobile door having a top rail provided with an upstanding flange, the upper edge of the flange being longitudinally curved downwardly in a forward direction, of a weather guard formed of sheet metal and having an upper edge which is longitudinally curved downwardly in a forward direction to correspond to the curvature of the upstanding flange, said guard having its material at its upper longitudinal edge bent inwardly and downwardly to provide a depending flange disposed at an angle to the guard for retaining the guard transversely inclined when placed in position, the depending flange being substantially vertically arranged behind the upstanding flange, spaced attaching ears carried by the depending flange, and means for securing the attaching ears to the top rail.

6. The combination with an automobile body having a window opening, of a weather guard secured to the body at the top of the window opening and inclined downwardly transversely, said guard tapering longitudinally in a forward direction to provide a reduced long narrow extension which projects downwardly below the lower edge of the guard for a substantial distance and terminates at a point near the longitudinal center of the window opening.

7. The combination with an automobile door having a top rail provided with an upstanding flange, the upper edge of the flange being longitudinally curved downwardly in a forward direction, of a sheet metal flexible weather guard which is longitudinally tapered in a forward direction to produce a forward narrow portion, the inner edge of the narrow portion extending laterally in an outward direction, the weather guard being provided with a depending flange at its inner edge which extends longitudinally of the guard and its narrow portion, the flange being disposed at an angle transversely with relation to the body portion so that it holds the body portion in an inclined position when the flange of the guard engages behind the flange of the door and is substantially vertically arranged.

8. The combination of an automobile door having a top rail provided with an upstanding flange, the upper edge of the flange being inclined downwardly in a forward direction, of a flexible weather guard having the longitudinal edge of its forward portion inclined laterally in an outer direction when the guard is horizontally arranged, the guard being transversely inclined in use so that the forward portion of the guard is bent inwardly from its normal position to bring its laterally inclined edge adjacent to the forward inclined edge of the flange of the door, and attaching means secured to the guard at its inner longitudinal edge to engage with the upstanding flange for retaining the guard in position.

9. The combination with an automobile body having a window opening, of a guard arranged upon the outer side of the body adjacent to the top of the window opening and inclined downwardly transversely in an outward direction, said guard being provided at its forward end with a long narrow extension, said extension being arranged transversely of the guard and projecting downwardly beyond the lower longitudinal edge of the guard, the long narrow extension being disposed adjacent to the forward end of the window opening.

PERCY D. HAY.